Nov. 16, 1954  M. ROSE  2,694,248
RIM FOR BUFFING TIRES
Original Filed Aug. 1, 1952  2 Sheets-Sheet 1
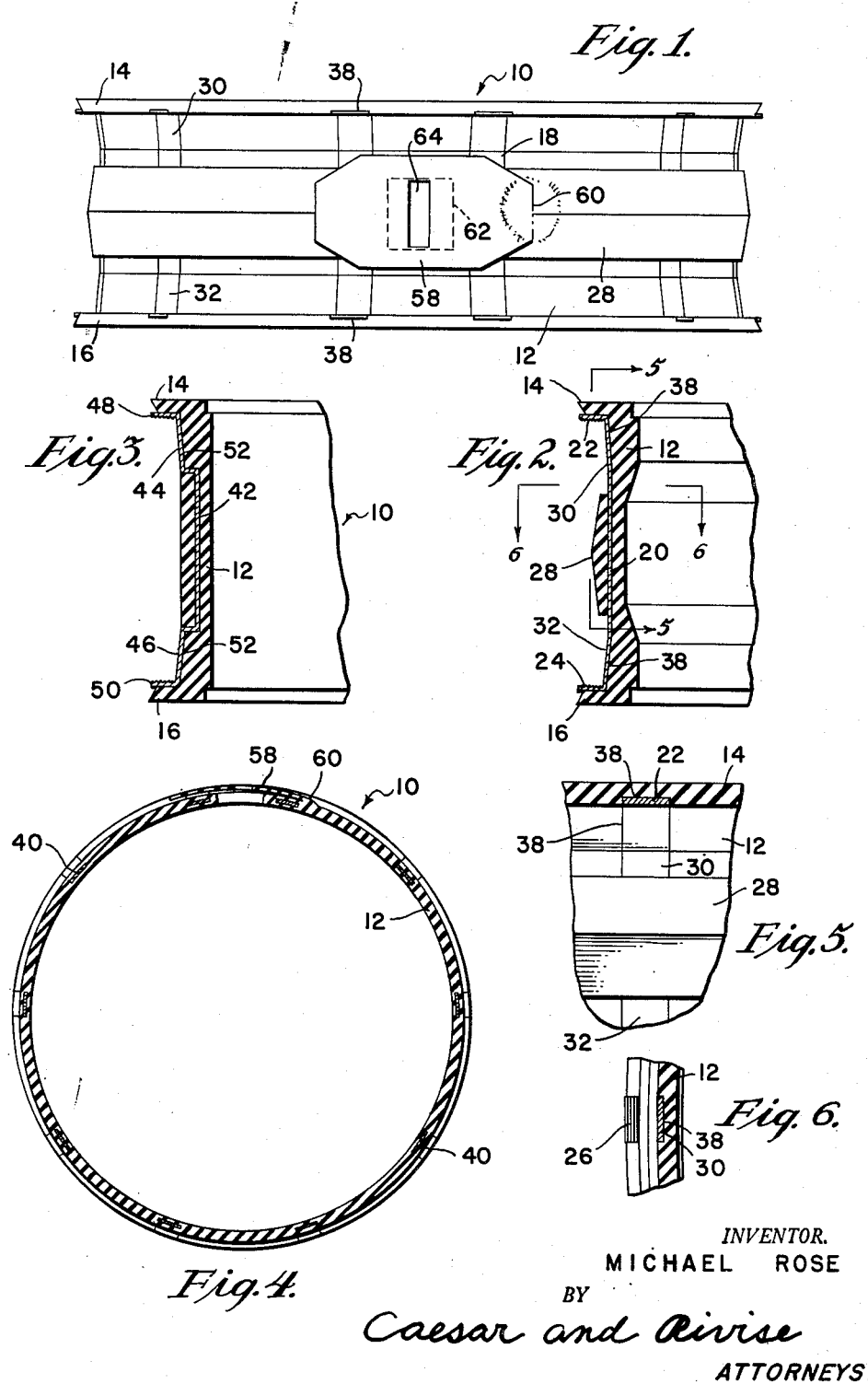
INVENTOR.
MICHAEL ROSE
BY
Caesar and Rivise
ATTORNEYS.

Nov. 16, 1954            M. ROSE            2,694,248

RIM FOR BUFFING TIRES

Original Filed Aug. 1, 1952            2 Sheets-Sheet 2

INVENTOR.
MICHAEL ROSE
BY
Caesar and Rivise
ATTORNEYS.

United States Patent Office 2,694,248
Patented Nov. 16, 1954

2,694,248

RIM FOR BUFFING TIRES

Michael Rose, Philadelphia, Pa.

Continuation of application Serial No. 302,291, August 1, 1952. This application May 26, 1953, Serial No. 357,437

10 Claims. (Cl. 29—76)

This invention relates to a flexible resilient tire-engaging rim for use in buffing, retreading and applying camelback to a tire and constitutes a continuation of my application Serial No. 302,291, filed Aug. 1, 1952.

The primary object of the invention is to provide a substantially circular rim which is resiliently flexible at least in the direction towards its center so that the same, when flexed, can be easily inserted in the tire and, when released, will snap into place and grippingly engage the tire bead. As a result, the rim can be mounted on and demounted from the tire without the use of tire irons, tools or special clamps of any kind thus effecting great savings in time, labor costs and materials.

A further object of the invention is to provide a flexible resilient rim which, despite its flexibility, is nevertheless so strong and sturdy that it will support a tire and inner tube which is inflated with a large quantity of air.

Most tires are at present buffed in machines of the type disclosed in U. S. Patents 1,848,684; 2,160,143 and 2,189,203. In these and similar machines the tire is mounted for free rotation on a carrier which is, in turn, mounted for free swinging movement in a horizontal plane to enable all portions of the lateral tread and sidewalls to be successfully brought into frictional engagement with a rapidly rotating buffer. Because of the flexibility of the present soft pressure tires, the tire collapses on contact with the buffer. This makes it difficult to control the shape of the tire to be buffed.

It is an important object of the present invention to provide a rim which will allow a low pressure tire to be buffed on buffing machines such as those described above without the disadvantages of tire collapse and lack of control of the tire shape. This is accomplished by mounting the tire and inner tube on the present flexible resilient rim and inflating the tube to obtain the desired tire stiffness. The rim is further provided with a flap means for protecting the valve stem of the inner tube.

Another object of the invention is to provide a flexible resilient rim for use in regrooving low pressure tires. Heretofore, because of the flexibility of low pressure tires, the application of a regrooving hand tool thereto would cause collapse of the tire making it impossible to properly recut and groove the tires. The present flexible resilient rim permits one to mount a low pressure tire and inner tube on the rim so that the tube can be inflated to the desired thickness to prevent the collapse of the tire upon contact with the regrooving tool.

Yet another object of the invention is to provide a flexible resilient rim for use in applying camelback to a soft low pressure tire. Because a soft tire will deform when camelback is applied thereto, it is not possible accurately to apply the camelback thereto. With the present flexible rim snapped in position and air applied in the inner tube thereof to the desired stiffness, camelback can be applied to the tire properly, accurately and with a minimum of effort and manipulation.

These and other objects of the invention will become more apparent as the following description proceeds in connection with the accompanying drawings, wherein:

Figure 1 is a side elevational view of the present flexible resilient rim;

Figure 2 is a vertical sectional view through the rim of Figure 1 and illustrating the position of tire bead-engaging strip thereon;

Figure 3 is a view similar to Figure 2 and illustrating a modified form of the rim;

Figure 4 is a horizontal sectional view through the modified rim of Figure 3;

Figure 5 is a sectional view taken on the line 5—5 of Figure 2;

Figure 6 is a sectional view taken on the line 6—6 of Figure 2;

Specific reference will now be made to the drawings wherein similar reference characters are used for corresponding elements throughout.

Figure 7:
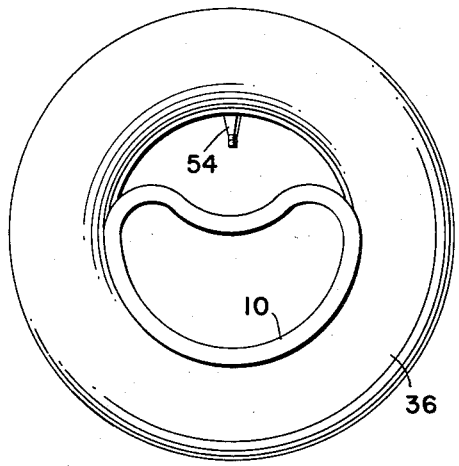
Figure 7 is a top plan view of the rim shown flexed and inserted in the hole of a tire containing an inner tube.
Figure 8:
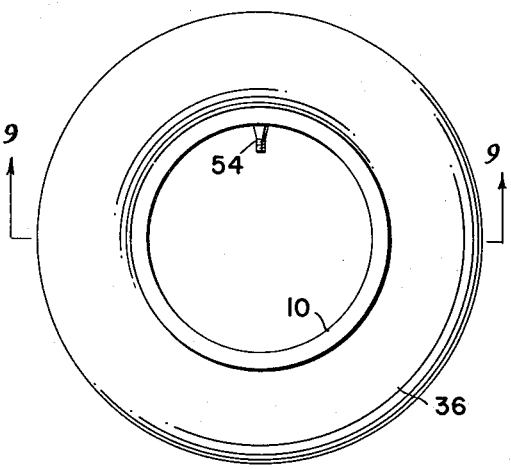
Figure 8 is a view similar to Figure 7 and showing the rim in its released position engaging the tire.

In its broadest aspect the present invention comprises a circular flexible resilient rim for use in buffing and retreading tires and applying camelback thereto, said rim including substantially inflexible means for gripping the tire bead and being resiliently flexible at least in the direction toward and away from the center of the rim. While it is preferred that the rim be made of rubber, it can be made of other materials provided it is so resiliently flexible as to be capable of flexion or distortion towards and away from its center. Thus when the rim is flexed towards its center it can be inserted in the hole of a tire and when it is released it snaps back to its original circular form at which point the substantially inflexible means of the rim engages the tire bead.

Referring first to the invention as shown in Figures 1, 2 and 5-12, the present flexible resilient rim is shown at 10 and includes a substantially circular central portion 12 having outward radially extending marginal flanges 14 and 16. In other words, the rim is substantially circular in horizontal cross-section and substantially U-shaped in vertical cross-section. The central portion and flanges are made of rubber or other equivalent material which is both flexible and resilient.

Carried by the central portion is a substantially inflexible means for grippingly engaging the outer surface of the tire bead. This means preferably comprises substantially U-shaped metallic strips 18 which are circumferentially spaced around the central portion and confined between the marginal flanges 14 and 16. Each strip includes a web 20 and legs 22 and 24, which latter may include serrations 26, see Figure 12.

A reinforcing band 28, also made of rubber or equivalent material, is fused or otherwise secured to the central portion 12 of the rim and embraces only a portion of the webs 20 of the metallic strips 18, as shown clearly in the drawings. This reinforcing band not only secures the metallic strips to the central portion of the rim but also serves so to strengthen the rim as to permit it to mount truck tires to be buffed.

Figure 9:
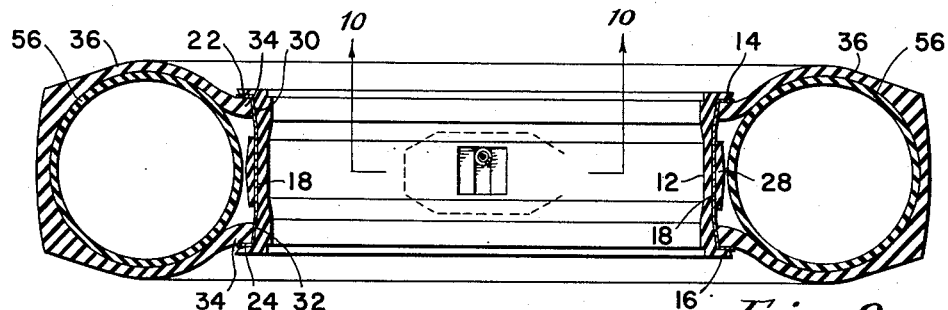
Figure 9 is a sectional view taken on the line 9—9 of Figure 8.

The unsecured portions 30 and 32 of the webs 20 are slightly inclined outwardly away from the central portion to conform to the outer edge of the bead 34 of the tire 36 when the legs 22 and 24 engage the bead as shown clearly in Figure 9. In addition, grooves 38 are cut into the central portion 12 and marginal flanges 14 and 16 to receive the unsecured portions 30 and 32 and the legs 22 and 24 of the metallic strips so that flexing pressure applied to the marginal flanges 14 and 16 of the rubber rim will separate the rim from the unsecured portions 30, 32 and the legs 22, 24 of the metallic strips for a purpose which will appear later.

In the modification shown in Figures 3 and 4, the construction is substantially the same as that previously described except that the tire bead-gripping means includes substantially U-shaped metallic strips 40 circumferentially spaced around the central portion 12 of the rim, each of which strips includes a portion 42 of its web which is embedded in the central portion. The unsecured portions 44 and 46 of the web are slightly inclined outwardly from the central portion and terminate in legs 48 and 50 which are disposed beneath the marginal flanges 14 and 16 of the rim and, like the legs 22 and 24 previously described, are adapted to grippingly engage the outer surface of the bead of the tire. This construction may be used effectively to provide a flexible and resilient rim capable of mounting the conventional automobile tires.

As in the case of the construction having the reinforcing band 28, the modified form including the partially embedded metallic strips 40 will include grooves 52 cut into the central portion 12 to receive the unsecured portions 44, 46 and legs 48, 50 of the metallic strips.

In both modifications a means is provided in the rim to receive and conceal the valve stem 54 of an inner tube 56 inasmuch as the rim is designed to mount the tire and inner tube as a unit.

Figure 10:
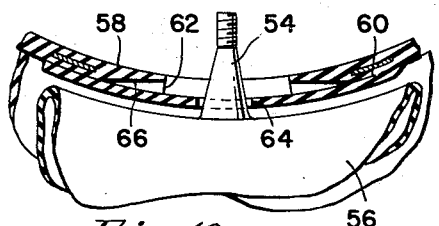
Figure 10 is a sectional view taken on the line 10—10 of Figure 9.
Figure 11:
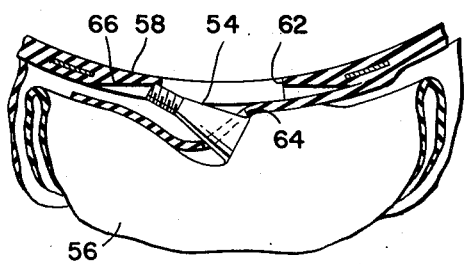
Figure 11 is a view similar to Figure 10 and illustrating the manner of shielding the valve stem of the inner tube.
Figure 12:
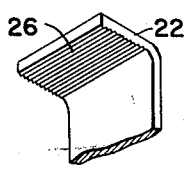
Figure 12 is a fragmentary enlarged perspective view of one end of the tire bead-engaging strip.

This means comprises a flap 58 hingedly secured as at 60 to the central portion 12 of the rim. The flap includes a hole 62 which registers with a hole 64 in the central portion of the rim. As shown in Figures 10 and 11, the stem is extended through the holes and after the tube is inflated is bent down to be concealed beneath the flap, being received in a cut out portion 66 provided in the undersurface thereof.

The present flexible resilient rim, as stated earlier, is used to mount a tire for buffing and retarding the same or applying csamelback thereto. In use, the rim is flexed, distorted or buckled towards its center and inserted in the hole of a tire equipped with an inner tube as shown in Figure 7. Because of the resilient flexibility of the rim, when it is released it snaps back to its circular form, as in Figure 8, with the legs 22, 24 or 48, 50 of the metallic strips engaging the bead portion 34 of the tire. Thereafter the inner tube is inflated to impart the desired stiffness to the tire at which time the legs of the metallic strips firmly grip the tire bead as shown clearly in Figure 9. The valve stem 54 is then hidden behind the flap 58 and the inflated tire and rim are mounted on buffing machines preferably of the type disclosed in U. S. Patents 1,848,684, 2,160,143 and 2,189,203.

The removal of the rim from the tire is as easily effected as its mounting. This is done by grasping the marginal flanges 14 and 16 and pulling towards the center of the rim and this can be readily effected because the flanges and the end portions of the rim are separable from the metallic strips. In so doing the rim is buckled or distorted to the position shown in Figure 7 allowing easy removal of the rim from the hole of the tire.

While preferred embodiments of the invention have been shown and described hereabove, it will be understood that minor variations may be made in the construction and arrangement of parts without departing from the spirit of the invention and the scope of the appended claims.

I claim:

1. A tire-engaging rim for use in tire buffing comprising a substantially circular flexible resilient member and substantially inflexible members carried by said flexible member and having means positioned to grippingly engage the bead of a tire, said flexible member being resiliently flexible at least in the direction towards its center.

2. A tire-engaging rim for use in tire buffing comprising a substantially circular flexible resilient member and generally U-shaped substantially inflexible strips carried by said member, the legs of said strips being positioned to grippingly engage the bead of a tire, said member being resiliently deformable towards its center so that it can be inserted in the hole of a tire and released into snap engagement with the bead thereof.

3. A tire-engaging rim for use in tire buffing comprising a substantially circular flexible resilient member having a central portion and opposing marginal flanges and generally U-shaped substantially inflexible strips circumferentially spaced and secured centrally to said central portion of said flexible member, the legs of said strips being positioned to grippingly engage the bead of a tire, said flexible member being resiliently flexible at least in the direction towards the center of said flexible member.

4. The combination of claim 3 wherein the legs of each of said strips are serrated and are adapted to engage the outer surface of the bead of a tire.

5. A tire-engaging rim for use in tire buffing comprising a substantially circular flexible resilient member having a central portion and opposing marginal flanges and generally U-shaped substantially inflexible strips circumferentially spaced about said flexible member and disposed between said marginal flanges, each of said strips including a web portion partially embedded in said central member and legs positioned to grippingly engage the bead of a tire, said flexible member being resiliently flexible at least in the direction towards the center of said flexible member.

6. The combination of claim 5 wherein the unsecured portions of the webs of said strips are inclined outwardly away from said central portion of said flexible member.

7. The combination of claim 5 wherein said central portion of said flexible member includes grooves for receiving the unsecured portions of the webs and legs of said strips.

8. A tire-engaging rim for use in tire buffing comprising a substantially circular flexible resilient member having a central portion and opposing marginal flanges and generally U-shaped substantially inflexible strips circumferentially spaced about said flexible member and disposed between said marginal flanges, each of said strips including a web and legs which are positioned to grippingly engage the bead of a tire, and a reinforcing band embracing a portion of said webs and secured to said central portion of said flexible member, said flexible member being resiliently flexible at least in the direction towards the center of said flexible member.

9. The combination of claim 8 wherein the unsecured portions of the webs of said strips are inclined outwardly away from said central portion of said flexible member.

10. The combination of claim 8 wherein said central portion of said flexible member includes grooves for receiving the unsecured portions of the webs and legs of said strips.

References Cited in the file of this patent

UNITED STATES PATENTS

| Number | Name | Date |
|---|---|---|
| 497,464 | Welch | May 16, 1893 |
| 1,198,790 | Fern | Sept. 19, 1916 |
| 1,300,391 | Hibbs | Apr. 15, 1919 |
| 2,071,864 | Myers | Feb. 23, 1937 |
| 2,227,220 | Gray | Dec. 31, 1940 |